United States Patent Office 2,987,450
Patented June 6, 1961

2,987,450
TEST COMPOSITION FOR SERUM ENZYMES
Harry G. Albaum and Edward K. Harvill, Brooklyn, N.Y., assignors to Miles Laboratories, Inc., Elkhart, Ind., a corporation of Indiana
No Drawing. Filed Mar. 16, 1959, Ser. No. 799,423
5 Claims. (Cl. 195—103.5)

This invention relates to a method for the qualitative and quantitative determination of serum enzymes occurring in biological fluids such as cerebro-spinal fluid, blood, urine and the like. Particularly the invention relates to diagnostic compositions useful for the detection of levels of enzymes in biological fluids by a colorimetric procedure wherein the color change is in proportion to the amount of enzyme present in said biological fluid being tested.

In recent years serum enzyme determinations have been found to be increasingly useful in the field of medical research. For example, alkaline phosphatase has been found to be useful in the diagnosis of bone sarcoma. Serum amylase levels are high in cases of acute pancreatitis. Acid phosphatase levels are usually elevated in cases of prostatic cancer. Glutamic oxalacetic transaminase has been found to be elevated following a myocardial infarct. It is to be seen, therefore, that methods for determining levels of such enzymes constitute a very useful tool to the medical practitioner, especially through the clinical diagnostic procedures relied upon.

Methods for measuring some of theses serum enzyme levels are known to the art. For example, phosphatase levels, levels of amylase, etc. may be determined by procedures that are well established and are routine in the usual clinical laboratory.

Ordinarily, however, these determinations are extremely complicated and may be accomplished only by skilled biochemical analysts utilizing special apparatus and other delicate equipment.

The object of this invention is to describe simple colorimetric procedures for the detection of certain serum enzymes. These procedures, which are based on a color change, may be carried out with the usual laboratory equipment available to all clinical laboratories and by any competent laboratory technician. Thus, the procedure of this invention represents an improvement over existing techniques obviating the necessity for specialized equipment, technique and personnel.

Generally stated, the inventive concept involves the formation of reduced diphosphopyridine nucleotide and the detection of the reduced diphosphopyridine nucleotide by a second enzyme system which comprises diaphorase and a color indicator. In accordance with the procedure of this invention, a change in the color of the dye is a quantitative measure of the level of reduced diphosphopyridine nucleotide, which is in turn either directly or indirectly related to the concentration of the enzyme under study.

The diaphorase used in the second enzyme system may be obtained from animal sources such as liver tissue or heart tissue, from yeast, bacterial sources and the like. The amount of diaphorase used is such as to insure complete oxidation of the reduced diphosphopyridine nucleotide to its oxidized form. It has been found that the diaphorase must be present in excess and when 0.1 ml. of serum is used a quantity of 150 units of diaphorase is suitable; a unit being described as that amount of diaphorase which will lead to a decrease in density of 2,6-dichlorindophenol of 0.001 mu in 1 minute in the presence of an excess of reduced diphosphopyridine nucleotide (0.3 mg./ml. in a final volume of 3.0 ml.).

Diphosphopyridine nucleotide is obtainable from animal tissue such as liver, yeast, etc.

The dye used in the second enzyme system may be selected from the group which has a more positive oxidation-reduction potential than the diphosphopyridine nucleotide-reduced diphosphopyridine nucleotide system (above $-0.282\ E_0$) and which does not undergo appreciable autoxidation, or whose autoxidation can be controlled. The preferable dye is 2,6-dichlorindophenol. The amount of the dye used will ordinarily vary between about 0.005 and 0.05 mg./ml. of final test solution, with from 0.01 to 0.03 mg. being especially preferred. As was stated above, an excess of diaphorase is used.

A substrate for the "diphosphopyridine nucleotide linked" enzyme is also included in the test composition. It is essential that an excess of this substrate be present and the amount required will depend upon the amount of the enzyme present in the biological fluid being tested. The test is conducted in a carefully buffered solution, using a buffer of pH 7 and a final volume of 3.0 ml. Phosphate buffer is particularly suitable of a pH of 7 in 0.1 M concentration.

In the systems designed in accordance with the inventive concept, the proper sample of the biological fluid being tested is admixed with a substrate for the suspected enzyme, a "diphosphopyridine nucleotide linked" enzyme such as lactic, glutamic, malic, or alcohol dehydrogenase, diphosphopyridine nucleotide, diaphorase and 2,6-dichlorindophenol. These components are buffered to a pH of 7 with the desired buffering solution and to a volume of about 3.0 ml. If the suspected enzyme is present in the biological fluid under test, it will react with its substrate, present in excess, to form a substrate for a "diphosphopyridine nucleotide linked" enzyme. This substrate and the reduced "diphosphopyridine nucleotide linked" enzyme present in excess will reduce the diphosphopyridine nucleotide present, which will in turn reduce the dye in the presence of diaphorase to result in a change in color density. If the system is properly set up, the change in color density will be proportional to the amount of the unknown enzyme present.

This decrease in color may be read in a standard spectrophotometer calibrated for 100% transmission at 600 mu. The color change may also be interpreted by comparison with a standardized color chart calibrated to read quantitatively the amount of serum enzyme. The test ingredients may also be used to impregnate a bibulous material such as a paper strip, filter paper, a tablet of cellulose material, etc., and a drop of the biological fluid to be tested contacted therewith. Other modifications of the mechanics of contacting the biological fluid to be tested with the test ingredients will be apparent to those skilled in the art.

It has also been found desirable in all cases to include a minor amount of an alubumin material, such as bovine albumin. This material is included for the purpose of stabilizing the system.

Set out in some detail below are specific examples which illustrate the concept of this invention. It is to be understood, of course, that these examples are illustrative only and other embodiments within the purview of this invention will readily become apparent to those skilled in the art.

EXAMPLE I

*Glutamic pyruvic transaminase*

A diagnostic composition for the detection of glutamic-pyruvic transaminase (GPT) was prepared and proceeded in accordance with the following reactions:

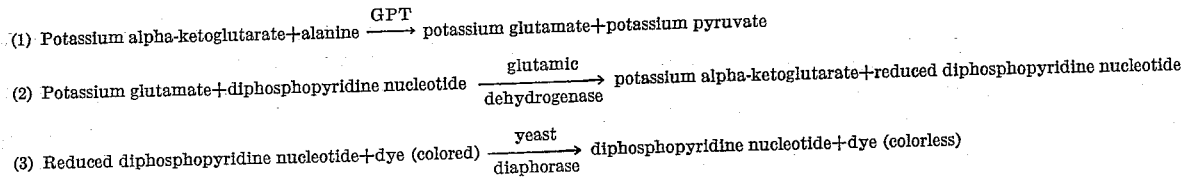

The composition had the following formulation:

| | Ml. |
|---|---|
| Buffer (potassium phosphate), pH 7.4–0.1 M | 0.8 |
| 2,6-dichlorindolphenol (10 mg./100 ml.) | 0.5 |
| Diphosphopyridine nucleotide (40 mg./10 ml.) | 0.6 |
| Alpha-ketoglutaric acid (1.1 M in phosphate buffer, final pH 7.4) | 0.4 |
| Alanine (0.2 M, final pH 7.4) | 0.4 |
| Glutamic dehydrogenase (1 mg./2 ml.) | 0.1 |
| Bovine albumin (10 mg./10 ml.) | 0.1 |
| Yeast diaphorase | 0.03 |

When used to assay 0.1 ml. blood serum containing glutamic pyruvic transaminase, the following results were obtained in the spectrophotometer, set at 600 mu. The changes recorded below may also be observed visually and readings compared with a standardized color chart:

| Initial Density | Density at the end of (min.)— | | |
|---|---|---|---|
| | 2 | 4 | 6 |
| .730 | .661 | .610 | .557 |
| Density Decrease | .069 | .120 | .173 |

The density decrease noted measures the decolorization of the dye and is a function of the glutamic pyruvic transaminase activity of the serum.

EXAMPLE II

Glutamic-oxalacetic transaminase

A diagnostic composition for the detection of glutamic-oxalacetic transaminase (GOT) was prepared in accordance with the following equations:

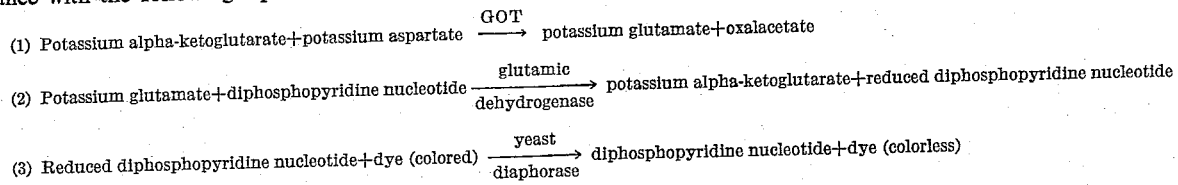

The composition had the following formulation:

| | Ml. |
|---|---|
| Buffer (potassium phosphate), pH 7.4–0.1 M | 0.8 |
| 2,6-dichlorindolphenol (10 mg./100 ml.) | 0.5 |
| Diphosphopyridine nucleotide (40 mg./10 ml.) | 0.6 |
| Alpha-ketoglutaric acid (1.1 M in phosphate buffer, final pH 7.4) | 0.4 |
| Glutamic dehydrogenase (1 mg./2 ml.) | 0.1 |
| Bovine albumin (10 mg./10 ml.) | 0.1 |
| Yeast diaphorase | 0.03 |
| Aspartic acid (0.2 M in phosphate buffer, pH 7.4) | 0.5 |

When contacted with 0.1 ml. serum containing glutamic-oxalacetic transaminase, the following results were obtained in the spectrophotometer, set at 600 mu. The changes recorded below may also be observed visually and readings compared with a standardized color chart:

| Initial Density | Density at the end of (min.)— | | | | |
|---|---|---|---|---|---|
| | 2 | 4 | 6 | 8 | 10 |
| .708 | .645 | .581 | .531 | .478 | .443 |
| Density Decrease | .063 | .127 | .177 | .230 | .265 |

The density decrease noted measures the decolorization of the dye and is a function of the glutamic-oxalacetic transaminase activity of the serum.

EXAMPLE III

Aldolase

A composition for the detection of aldolase (A) was prepared which had the following formulation:

| | Ml. |
|---|---|
| Buffer (potassium phosphate), pH 7.4–0.1 M | 1.2 |
| 2,6-dichlorindophenol (10 mg./100 ml.) | 0.5 |
| Diphosphopyridine nucleotide (40 mg./10 ml.) | 0.6 |
| Fructose-1,6-diphosphate (.002 M) | 0.4 |
| Glyceraldehyde phosphate dehydrogenase (0.1 mg./2 ml.) | 0.1 |
| Bovine albumin (10 mg./10 ml.) | 0.1 |
| Yeast diaphorase | 0.03 |

This composition, when contacted with 0.1 ml. blood serum containing aldolase, gave the following results in the spectrophotometer, set at 600 mu. The changes recorded below may also be observed visually and readings compared with a standardized color chart:

| Initial Density | Density at the end of (min.)— | | | | |
|---|---|---|---|---|---|
| | 2 | 4 | 6 | 8 | 10 |
| .777 | .708 | .652 | .592 | .545 | .489 |
| Density Decrease | .069 | .125 | .185 | .232 | .288 |

The density decrease noted measures the decolorization of the dye and is a function of the aldolase activity of the serum.

The reactions upon which this assay procedure is based, are as follows:

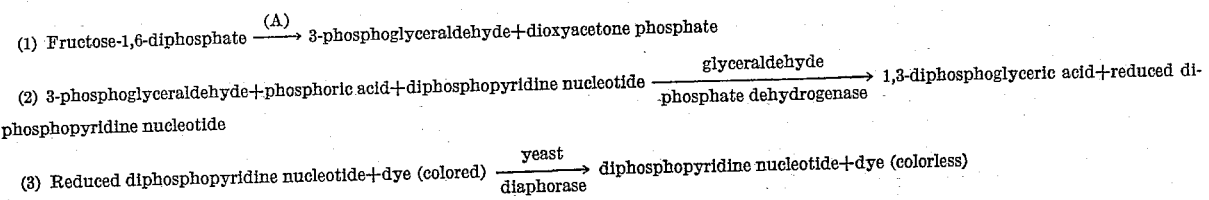

To reiterate briefly, this invention comprises a method for the determination of enzymes in biological fluids which have been found to have medical significance and to compositions which are useful in such testing procedures. The test procedures and the composition therefor in all instances depends upon the change of color density resulting when reduced diphosphopyridine nucleotide, in the presence of diaphorase, contacts a dye, whose oxidation-reduction potential is above about $-0.282$ $E_0$ or which has a more positive oxidation-reduction potential than the diphosphopyridine nucleotide-reduced diphosphopyridine nucleotide system. The system comprises a substrate for an enzyme under study, a "diphosphopyridine linked" enzyme, diphosphopyridine nucleotide, diaphorase, and a color indicator, the system being buffered to a pH of about 7.

What is claimed is:

1. A composition for the detection of enzymes which, as a result of their activity, produce a substrate for a diphosphopyridine nucleotide linked enzyme which comprises in combination a substrate for said enzyme, a diphosphopyridine nucleotide linked enzyme, diphosphopyridine nucleotide, diaphorase, and a color indicator having an oxidation-reduction potential above that of the diphosphopyridine nucleotide-reduced diphosphopyridine nucleotide system and which is not subject to autoxidation, said composition being buffered to a pH of about 7.

2. A composition in accordance with claim 1 wherein said color indicator is 2,6-dichlorindophenol.

3. A composition for the detection of glutamic pyruvic transaminase which comprises in combination a salt of alpha-ketoglutaric acid, alanine, glutamic dehydrogenase, diphosphopyridine nucleotide, diaphorase and 2,6-dichlorindophenol, said composition being buffered to a pH of about 7.

4. A composition for the detection of glutamic-oxalacetic transaminase which comprises in combination a salt of alpha-ketoglutaric acid, a salt of aspartic acid, glutamic dehydrogenase, diphosphopyridine nucleotide, diaphorase and 2,6-dichlorindophenol, said composition being buffered to a pH of about 7.

5. A composition for the detection of aldolase which comprises in combination fructose-1,6-diphosphate, glyceraldehyde dehydrogenase, diphosphopyridine nucleotide, diaphorase and 2,6-dichlorindophenol, said composition being buffered to a pH of about 7.

References Cited in the file of this patent

UNITED STATES PATENTS 2,359,052   Scharer _____ Sept. 26, 1944

FOREIGN PATENTS 203,451   Australia _____ Sept. 27, 1956

OTHER REFERENCES

"Enzymes," by Dixon et al., pages 199 and 403, 1958, published by Academic Press Inc., New York.

"Outlines of Enzyme Chemistry," by Neilands et al., page 391, 1958, 2nd Edition, published by John Wiley & Sons Inc., New York.